UNITED STATES PATENT OFFICE.

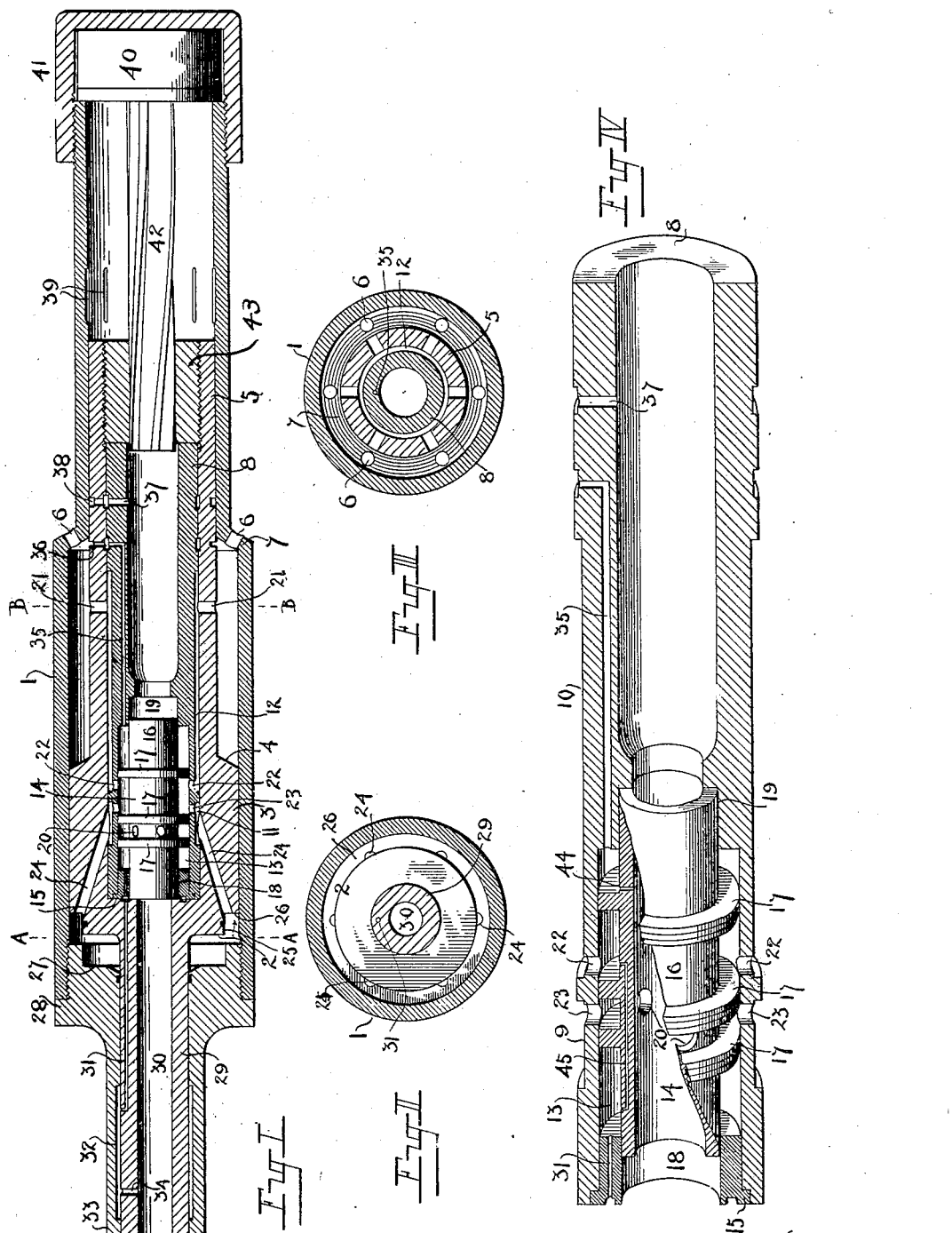

WILHELM MAUSS, OF BRAKPAN, TRANSVAAL, ASSIGNOR TO THE KONOMAX ROCK DRILL SYNDICATE LIMITED, OF JOHANNESBURG, TRANSVAAL.

PERCUSSION-ENGINE.

No. 931,449.  Specification of Letters Patent.  Patented Aug. 17, 1909.

Application filed July 25, 1907. Serial No. 385,578.

*To all whom it may concern:*

Be it known that I, WILHELM MAUSS, a subject of the King of Great Britain, and residing at Brakpan, Transvaal, (the post-office address being care of The Victoria Falls Power Co. Limited, (Brakpan Branch,) Brakpan, Transvaal,) have invented new and useful Improvements in Percussion-Engines, of which the following is a specification.

This invention relates to percussion machines and tools operated by expansible fluid and is in many respects a modified construction of the machine described in Patent No. 844,161, issued February 12th, 1907.

In such machine constant pressure is applied to a relatively small rear pressure area and fluid is caused to work expansively against a relatively larger front pressure area, on the backward stroke; at the end of which stroke such expanded fluid is exhausted and the working blow is effected by the uncushioned pressure on the rear face. Admission to and exhaust from the front pressure area is controlled by a valve, while cut off is afforded by the movement of the piston closing a port.

The primary object of this invention is to construct a machine of the type referred to, with an internal valve, so that the entire machine is compact and has no protruding parts which are liable to be damaged when handling the machine or which may be inconvenient for other reasons.

The invention is illustrated in the accompanying drawing, Figure I being a longitudinal section, Fig. II a section on the plane A—A Fig. I, Fig. III a section on the plane B—B Fig. I and Fig. IV an enlarged view, partly sectional of the bush and valve hereafter fully described. In Fig. I the valve is shown in one extreme position and in Fig. IV in its other extreme position.

In the drawings 1 represents a cylinder, within which works a differential piston. The front pressure area consists as before of the front face 2 of a larger piston member 3, while the rear pressure area is preferably constituted by the shoulder 4 formed at the junction with the larger piston member of a smaller piston member or trunk 5 projecting rearwardly therefrom.

Air is constantly supplied to the rear pressure area 4 by a series of holes 6 formed through the shoulder 7 of the cylinder; such holes being shown without any controlling means, since the particular machine illustrated is designed to be inclosed within a guiding shell, which latter is suitably supplied with pressure air.

The piston is bored out from the rear to accommodate an internal bush 8 which is turned down peripherally at the parts 9 and 10 (Fig. IV) so as to form, with the piston, two annular ports 11 and 12 (Fig. I).

The front end of the bush is bored out to form a valve chamber 13 within which is located the distributing valve 14, the front end of the valve chamber being constituted of a separate annular piece 15. The valve comprises a hollow cylindrical body 16 carrying three peripheral rings 17; the ends of the body 16 fitting within the cavities 18 and 19 formed within the annular piece 15 and the bush respectively. The travel of the valve is limited by contact of the ends of the body with fixed parts, as seen in Figs. I and IV; the valve chamber is of such size that a considerable space always remains between the end rings 17 and the end walls of the valve chamber.

A series of holes 20 afford communication between the interior of the valve and the space inclosed by the two forward rings 17. Communication between the live air reservoir and the valve chamber is made by a series of holes 21 opening from the periphery of the piston member 5 to the annular port 12 and by a second series 22 drilled through the bush. Adjacent to the latter is a further series 23 connecting the valve chamber to the annular port 11 from which the holes 24 lead to the front cylinder face. The latter holes open upon a shoulder 25 turned on the front piston face such that the area 26 to the rear of the shoulder is less than the pressure area 4; a corresponding recess 27 is sunk in the front head 28 of the cylinder.

The interior of the valve is put into communication with the atmosphere in any suitable manner; as illustrated, the piston and piston rod 29 are both hollow and the bore 30 of the latter is arranged to open to atmosphere outside of the machine.

For operating the valve, a small channel 31 is carried from the front end of the valve chamber to open upon the periphery of the piston rod 29 and to communicate either with an annular groove 32 formed internally of the neck 33 which surrounds the piston rod, or with the front cylinder space, according to the position of the piston; the groove 32 is connected to exhaust by any suitable means such as the hole 34 drilled through the piston rod. Similarly the channel 35 leads from the rear of the valve chamber to an annular recess 36 cut in the periphery of the smaller piston member 5. Corresponding in function to the hole 34 just mentioned is a hole 37 which joins the annular groove 38 to exhaust: while 39 indicates a series of shallow slots cut in the cylinder wall, by which the annular grooves 36 and 38 may be connected. The purpose of the beforementioned dead spaces at the ends of the valve chamber, is to prevent too violent actuation of the valve by air introduced through the channels 31 and 35, when beginning its strokes, and also to prevent undue cushioning at the end of its strokes.

40 indicates an ordinary ratchet box which is held to the cylinder end by the screwed cap 41, and 42 is the rifle bar projecting therefrom. The rifle nut 43 may be screwed into the rear of the piston and may conveniently be made to hold the bush 8 and piece 15 in place.

In operation the parts being in the position shown in Fig. I, and air being constantly supplied through the ports 6, a portion of the same passes by way of the holes 21, annular port 12, holes 22 and 23, port 11 and holes 24 to the front of the piston. The front pressure area being greater than at the rear, the piston moves backward until the holes 21 are covered by the shoulder 7 and the air supply to the front cylinder space being thereby cut off, the remainder of the stroke is effected by expansion of the air inclosed in the front cylinder.

During the backward stroke the front of the valve chamber has been exposed to pressure by the mouth of the channel 31 coming into the front cylinder space and at the termination of the stroke air is exhausted from behind the valve by way of channel 35, groove 36, slots 39, groove 38 and hole 37. The valve is thereby reversed as shown in Fig. IV, and air being exhausted from the front pressure area through the holes 24, 23 and 20, the constant pressure on face 4 causes the piston to deliver an unimpeded working blow. During the forward stroke channel 31 having opened to the groove 32 and air having been thereby exhausted from the front of the valve just before the blow is struck channel 35 receives air from the live air space and throws the valve forward; live air is thus once more admitted to the front of the cylinder and the cycle is repeated.

In the event of the drill failing to reach the rock face, when delivering a blow, the piston is cushioned after exceeding its proper stroke by the shoulder 25 entering the recess 27 and compressing the air therein. Such movement moreover cuts off the supply of air from the holes 24 to the greater part of the front pressure area, whereby the piston is prevented from returning and the machine is automatically stopped until it has been readjusted to the work.

The channel 31 is made considerably smaller than channel 35, being in fact of such size that an appreciable time is occupied for the passage of air through it to or from the valve; and as has been stated it opens to pressure during and not at the termination of the rearward stroke. The purpose of this arrangement is to enable the drill to operate without completing a full rearward stroke, such shortening of the stroke either being effected purposely by throttling the air supply with the object of delivering light blows, or occurring when the drill is impeded in its withdrawal by accumulation of dirt, in which case the repetition of the forward stroke, made under full pressure, tends to relieve the drill. When such short strokes are being made the channel 31 operates in conjunction with a small hole 44 by which a constant small leakage to exhaust occurs from behind the valve, and with a small duct 45 formed in the valve body 16 and having its terminals arranged substantially as shown.

The modified operation is as follows. Upon the piston failing to move backward to the full extent, although far enough for pressure air to enter the channel 31, the air from the back of the valve exhausts through the hole 44 and the valve begins to reverse. Just before it exhausts the front cylinder and thereby practically deprives itself of its motive power, the front terminal of duct 45 is uncovered, whereby pressure air stored in the space between the two rear rings 17 and also in the annular port 12 is passed to the front of the valve and insures a smart completion of the latter's stroke. The valve being thus fully thrown back, the piston makes a forward stroke under full pressure, and is reversed in the normal manner. It is to be observed that the size of the hole 44 and the duct 45 is such that when the machine is working normally, their influence is inappreciable.

It will be noted that in all cases the motion of the valve is positive in a high degree, since the momentum imparted to the valve by the piston tends to reverse it at the termination of each piston stroke, independently of the air actuating means described.

What I claim is:—

1. In combination, the piston comprising the larger member 3 and smaller member 4, the corresponding cylinder 1, means for rotating the piston, the distributing valve 14, the annular groove 36, the channel 35 leading thence to the back of the valve, the slots 39 adapted to connect groove 36 to exhaust, the smaller channel 31 leading to the front of the valve, and the annular groove 32, adapted to connect channel 31 to exhaust, substantially as hereinbefore described.

2. In combination, a piston, a bush fitted internally thereof, said bush being turned down peripherally to form with the piston two annular ports, a valve fitted within said bush, means connecting each of such ports with the valve and the piston periphery respectively, a separate piece such as 15 forming one end of the valve chamber, and a nut secured to the piston and serving to retain the bush and loose piece aforesaid in position.

3. In combination, a cylinder, a piston working therein, having a relatively small rear pressure area to which pressure air is constantly supplied and a relatively larger front pressure area, means for supplying pressure air to the front pressure area to effect the rearward stroke, and means operating upon the piston making an unduly long forward stroke to cushion the piston and to reduce the amount of the front pressure area which is exposed to pressure to such an extent as to prevent retraction of the piston.

4. In combination, a cylinder, a piston working therein, having a relatively small rear pressure area exposed to constant pressure and a relatively large front pressure area, said front area having a shoulder turned thereon and there being a corresponding recess formed in the front cylinder head, means for supplying air to the front pressure area to effect the rearward stroke, said means opening upon the shoulder aforesaid, said shoulder being adapted upon the piston making an unduly long forward stroke, to enter the recess in the cylinder head, thereby cushioning the piston and cutting off backwardly acting pressure from the greater part of the front pressure area.

5. In a reciprocating percussive engine having an air-operated distributing valve; a valve actuating means comprising a relatively large channel to one side of the valve, said channel being opened to pressure and exhaust substantially at the termination of the forward and rear strokes respectively of the piston, means permitting a continuous small leakage from the same side of the valve and a relatively small channel to the other side of the valve said small channel being opened to pressure and exhaust during the rearward and forward strokes respectively of the piston.

6. In a reciprocating percussive engine having an air-operated distributing valve; a valve actuating means, comprising a relatively large channel to one side of the valve, said channel being opened to pressure from the rear piston pressure area substantially at the termination of the forward stroke of the piston and being also opened to exhaust substantially at the termination of the backward stroke of the piston, means permitting a small constant leakage from the same side of the valve, a relatively small channel to the other side of the valve, said small channel being opened to pressure from the front piston pressure area during the rearward stroke of the piston and to exhaust during the forward stroke of the piston, and means for admitting a reinforcing supply of high pressure air to such other side of the valve immediately before the valve exhausts the front cylinder.

In testimony whereof I affix my signature in presence of two witnesses.

WILHELM MAUSS.

Witnesses:
WILLIAM HOWORTH WOOD,
ALFRED L. SPOER.